US012665365B2

(12) United States Patent
Peng

(10) Patent No.: US 12,665,365 B2
(45) Date of Patent: Jun. 23, 2026

(54) EXTENSION LAMP SOCKET

(71) Applicant: Rich Brand Industries Limited, Dongguan City (CN)

(72) Inventor: Te-Shui Peng, Taoyuan City (TW)

(73) Assignee: Rich Brand Industries Limited, Dongguan City (CN)

( * ) Notice: Subject to any disclaimer, the term of this patent is extended or adjusted under 35 U.S.C. 154(b) by 311 days.

(21) Appl. No.: 18/407,590

(22) Filed: Jan. 9, 2024

(65) Prior Publication Data

US 2025/0226632 A1 Jul. 10, 2025

(51) Int. Cl.
*H01R 33/94* (2006.01)
*H01R 33/22* (2006.01)

(52) U.S. Cl.
CPC ............. *H01R 33/94* (2013.01); *H01R 33/22* (2013.01)

(58) Field of Classification Search
CPC ................................ H01R 33/22; H01R 33/94
See application file for complete search history.

(56) References Cited

U.S. PATENT DOCUMENTS 2,818,498 A * 12/1957 Foch ....................... F21L 14/02 362/183
3,099,507 A * 7/1963 Tesmer .................. H01R 33/92 439/643
3,355,612 A * 11/1967 Peek, Jr. ............... F21V 19/008 315/71
3,372,302 A * 3/1968 Fasola .................... H01R 33/94 200/51.14
3,405,383 A * 10/1968 Jarboe ...................... H01K 3/32 439/6
4,046,448 A * 9/1977 Miller ...................... F21V 21/22 439/640
4,516,054 A * 5/1985 Shikama ................... H01J 7/44 315/71
5,526,250 A * 6/1996 Ting ..................... H01R 25/142 362/652
5,731,663 A * 3/1998 Davis ..................... H05B 39/08 439/642
5,893,769 A * 4/1999 Lin ...................... H01R 13/504 439/340
5,893,774 A * 4/1999 Lin ........................ H01R 33/22 439/417
6,079,997 A * 6/2000 Lu ...................... H01R 13/5227 439/666
(Continued)

*Primary Examiner* — Tulsidas C Patel
*Assistant Examiner* — Thomas K Quigley
(74) *Attorney, Agent, or Firm* — Best & Flanagan LLP

(57) ABSTRACT

An extension lamp socket is disclosed and the extension lamp socket can be screwed into the screw connecting part of the conventional lamp socket for combination. The screw connector of a light bulb can be screwed in from the bottom end of the shell wall of the extension lamp socket and be fixed with the internal threaded convex body. In this way, the power source of the conventional lamp socket can be connected with the light bulb via the extension lamp socket. When installing a light bulb that occupies a large space, the extension lamp socket can be used to lower the screw connecting position. When installing a light bulb in a narrow or special space, the extension lamp socket can be used to extend the screw connecting position outward to facilitate installation of the light bulb.

9 Claims, 10 Drawing Sheets

(56) References Cited

U.S. PATENT DOCUMENTS

| | | | | |
|---|---|---|---|---|
| 6,910,918 | B1 * | 6/2005 | Driver | F21V 21/002 362/153.1 |
| 8,328,582 | B1 * | 12/2012 | Carley | F21V 23/06 439/642 |
| 10,193,289 | B1 * | 1/2019 | Peng | H01R 4/48 |
| 11,735,880 | B1 * | 8/2023 | Wu | F21V 23/06 362/267 |
| 2005/0135107 | A1 * | 6/2005 | Currie | F21K 9/23 362/382 |
| 2005/0231964 | A1 * | 10/2005 | Tufano, Sr. | H01J 5/48 362/458 |
| 2006/0019544 | A1 * | 1/2006 | Tufano | H01R 33/94 439/642 |
| 2006/0044842 | A1 * | 3/2006 | Pazula | H01R 33/94 362/228 |
| 2007/0264870 | A1 * | 11/2007 | Ratican | H01R 33/94 439/529 |
| 2011/0140638 | A1 * | 6/2011 | Frazzini | F21V 21/22 439/445 |
| 2012/0050060 | A1 * | 3/2012 | Liao | H01R 33/945 340/815.4 |
| 2013/0012040 | A1 * | 1/2013 | Cofini | H01R 33/0836 439/108 |
| 2013/0258681 | A1 * | 10/2013 | Wu | F21V 19/006 362/374 |
| 2015/0233558 | A1 * | 8/2015 | Ticktin | F21K 9/235 362/423 |
| 2015/0325961 | A1 * | 11/2015 | Blakborn | H01R 13/6581 439/271 |
| 2015/0364853 | A1 * | 12/2015 | Thijssen | F21S 8/061 439/660 |
| 2016/0248207 | A1 * | 8/2016 | Fruhauff | H01R 33/94 |
| 2018/0128455 | A1 * | 5/2018 | Tang | F21V 19/006 |
| 2019/0067890 | A1 * | 2/2019 | Nguyen | H01R 13/6276 |

* cited by examiner

EXTENSION LAMP SOCKET

BACKGROUND OF THE INVENTION

The present invention is generally directed to a lamp socket, and more particularly to an extension lamp socket having an extension length to apply to a light bulb occupying a large space for the screw connection.

DESCRIPTION OF THE RELATED ART

A lamp socket is a socket body provided for screw connection of the screw head on the top of a light bulb. The prior art lamp sockets could have a variety of configurations, such as, the use of a common prior art lamp socket 10 as shown in FIG. 1. The lamp socket 10 is configured on the center of the top of a lampshade 11 and electrically connected to an external power source (such as mains electricity or charging power source) via an upward extending power cord 12. The lampshade 11 is generally embedded on a board 13 located at a high place, and a screw connection part is defined inside the lamp socket 10, wherein the screw connection part is provided for a screw connector 141 on the top of a light bulb 14 to be screw connected at the time of using. When the power switch is turned on, the external power source supplies electricity to the light bulb 14 via the power cord 12 and the lamp socket 10, thereby enabling the light bulb 14 to emit light and project light rays from above. The lamp of FIG. 1 is generally installed at a high place for use, which is called as "recessed lamp" or "ceiling lamp". The light bulb 14 is an illuminating component, and in early period, tungsten light bulbs were used and then the energy-saving light bulbs are developed, and nowadays LED light bulbs are becoming more and more popular. However, the foregoing light bulbs 14 have a common point, that is, the screw connector 141 and the lamp socket 10 are used to achieve the screw connection and the conduction for power supply.

A recessed lamp as shown in FIG. 1 is taken for an example. The internal space of the lampshade 11 is limited but has no problem to install a normal spherical bulb because the internal space is sufficient to allow the hands to hold the bulbs to reach in for installation or removal. However, due to technological progress, nowadays there are many special and novel styles of illuminating components (light bulbs) and occupy a large space at the time of using. When installing the kind of light bulbs occupying a large space, the conventional lamp socket 10 is subject to be restricted. For the same reason, when the lamp socket 10 is located at a narrow or special installation space, it will be difficult for the hands to hold a light bulb to reach into the space for installing the light bulbs.

SUMMARY OF THE INVENTION

In view of the above deficiency, the inventor proceeds with a research and improvement. Thus, the primary object of the present invention is to provide an extension lamp socket for installing a light bulb required a large space for installation via screw connection.

It is another object of the present invention to provide an extension lamp socket for installing a light bulb on a lamp socket located in a narrow or special space.

To achieve the above-mentioned object, the present invention provides an extension lamp socket, comprising a first half shell, a second half shell, a first electrode plate, a second electrode plate and an electrode holding ring, wherein, the first half shell and the second half shell are non-conducting components and have a corresponding relationship mutually, a plurality of clamping plates are horizontally configured in the middle section of inner space of the corresponding internal spaces, a front edge of the clamping plate is provided with a clamping slot, the two side edges of the first half shell and the second half shell are provided with a structure capable of snapping and jointing mutually, the first half shell and the second half shell are respectively formed with an penetrating tube slot between the two clamping plates located at a lower position, the bottom section of the first half shell and the second half shell are in a shape of an outwardly expanded cover wall, the outer edge of the top section of the first half shell and the second half shell are both defined as a side threaded convex body having a shape of spiral arch convex, the top ends are respectively configured with two top snapping slots arranged parallelly, the side threaded convex body of the second half shell is configured with a transverse clamping slot on an edge of one side, the first half shell and the second half shell is provided with an internal threaded convex body having a shape of spiral arch convex on the inner wall below the penetrating tube slot to the cover wall, a recessed supporting thin slot is respectively defined on the edge of the same side of the first half shell and the second half shell and the clamping slot, and the bottom end thereof is further formed as a positioning slot.

The first electrode plate has an upright base bar extending up and down, wherein the top edge is extending a small section to bend inward and straight upward to form a top clamping plate, and then bending horizontally to configure an upper conducting point at the middle, finally bending downward to form another top clamping plate, the bottom edge of the upright base bar extends downward for a small section to form a snapping plate, and then bends inward slopingly to configure a lower conducting point at the middle, at least the upper conducting point and the lower conducting point of the first electrode plate are presenting to have a conductive property, and when assembly, the top clamping plates of the first electrode plate are aligned to the top snapping slot of the second half shell to be inserted one by one correspondingly, thereby enabling the upper conducting point protruding out of the second half shell and meanwhile, the bar body of the upright base bar of the first electrode plate and the snapping plate going into the corresponding clamping slot to rest, and the snapping plate pushes the lower conducting point into the space below the penetrating tube slot to rest.

The second electrode plate has an upright base bar extending up and down and the top edge is extending a small section to form a snapping plate, and then extending outward and further downward to form a clamping hook, and the outer wall of the clamping hook is provided with an upper conducting point, the bottom edge of the upright base bar is firstly bent outward slopingly, and then extending outward and the downward slope to form a snapping plate, the final end bends outward to form an inserting connection plate, the snapping plate is configured with a lower conducting point, at least the upper conducting point and the lower conducting point of the second electrode plate present have conductive property, when assembly, the clamping hook of the second electrode plate clamps the clamping slot from the interior of the second half shell, thereby enabling the upper conducting point on the external wall of the clamping hook to be placed out of the wall of the second half shell, and the bar body extending up and down from the upright base bar of the second electrode plate and the snapping plate enter into the corresponding clamping slot to rest, and the bottom section of the snapping plate of the second electrode plate is approaching to the supporting thin slot, and meanwhile, the inserting connection plate on the final end is inserted into the positioning slot to position, and then, the first half shell faces toward the second half shell to cover and achieve the snapping function via the structure of mutually snapping and connection between two side edges, and in the process, the top clamping plate of the first electrode plate is correspondingly inserted into the top snapping slot of the first half shell, and meanwhile, the bar body extending from the upright base bar of the first electrode plate and the snapping plate enter into the clamping slot corresponding to the first half shell to rest, and the upper conducting point of the first electrode plate jointly protrude out of the first half shell and the second half shell, and then, a first jointing component is used to go through the penetrating tube slots of the first half shell and the second half shell to further secure and connect.

The electrode holding ring is conductive and the peripheral wall thereof is configured with a side threaded convex body having a continuous spiral arch convex and the top end and bottom end are designed to be hollow, when assembly, the electrode holding ring is screwed to the side threaded convex body after the first half shell and the second half shell are combined, thereby enabling the electrode holding ring to be completely and tightly jointed with the side threaded convex body.

According to the above-mentioned extension lamp socket, the first half shell and the second half shell are in a long shape having a micro taper on top and bottom and a shell having an arch shape is configured on the periphery.

According to the above-mentioned extension lamp socket, a structure allowed to be snapped and jointed mutually configured on the two side edges of the first half shell and the second half shell are a snapping slot and a tenon.

According to the above-mentioned extension lamp socket, a through hole is respectively formed on the two sides close to the bottom edge of the first half shell and the second half shell, and when the first half shell and the second half shell are snapped mutually, a second joint component is used to go through the through hole of the first half shell and the second half shell for screw fixing and jointing.

According to the above-mentioned extension lamp socket, a micro positioning convex column is additionally configured adjacent to the through hole, a space on an adjacent edge of the through hole on the other side is correspondingly expanded, and when the first half shell and the second half shell are corresponding to snap mutually, the positioning convex column is insert into the corresponding expanded space of the through hole on the other side.

According to the above-mentioned extension lamp socket, a structure capable of correspondingly inserting and connecting to each other is configured at the middle of the top section of the first half shell and the second half shell, and when the first half shell and the second half shell are correspondingly snapped with each other, the structure capable of correspondingly inserting and connecting to each other can achieve a function of corresponding insertion and connection.

According to the above-mentioned extension lamp socket, the structure capable of correspondingly inserting and connecting to each other is an inserting shaft and an inserting slot.

According to the above-mentioned extension lamp socket, after the electrode holding ring is combined with the first half shell and the second half shell, a side threaded convex body is sleeved and screw connected to be complete tight fit and connection, and then a pressing and deforming can be carried out from a bottom end of the electrode holding ring, and after the pressing and deforming is completed, the electrode holding ring will not separate from the side threaded convex body.

According to the above-mentioned extension lamp socket, after the electrode holding ring is completely and tightly fitted with the side threaded convex body formed after the first half shell and the second half shell are combined, the periphery of the bottom end of the electrode holding ring can be pressed and deformed, so that the electrode holding ring will not separate from the side threaded convex body.

DETAILED DESCRIPTION OF EMBODIMENTS OF THE INVENTION

For better understanding of the technical means adopted to accomplish the above object of the present invention as well as the efficacy of the invention, the following preferred embodiment is used as an example for detailed explanation and description of the invention with reference to the accompanying drawings.

Figure 2:
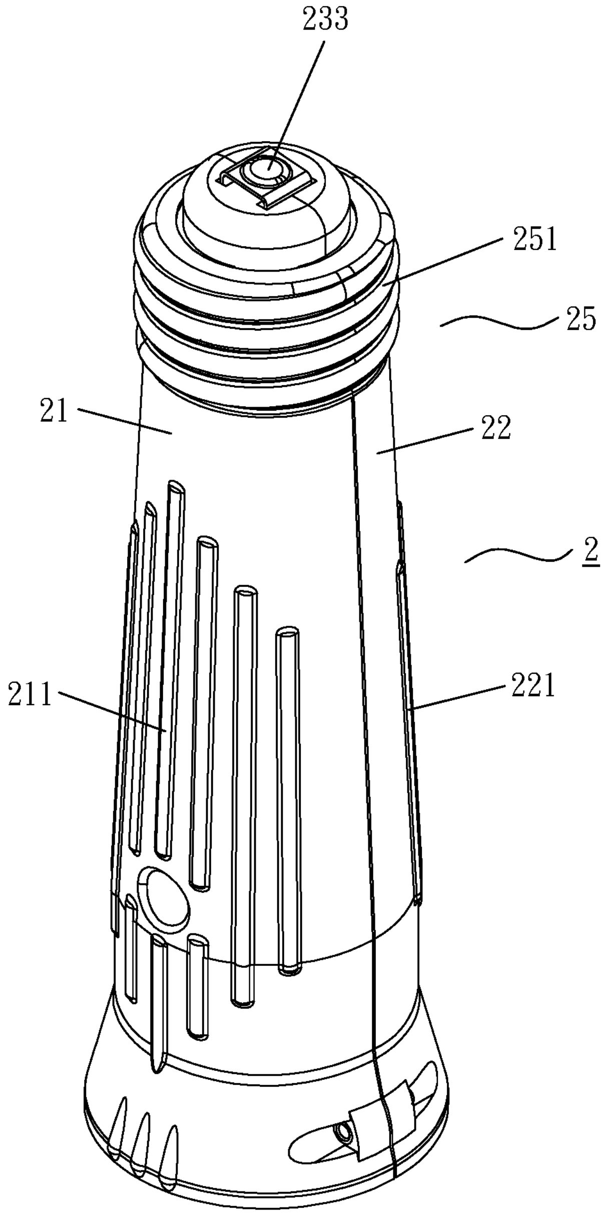
FIG. 2 is a perspective view of a preferred embodiment of the present invention.
Figure 3:
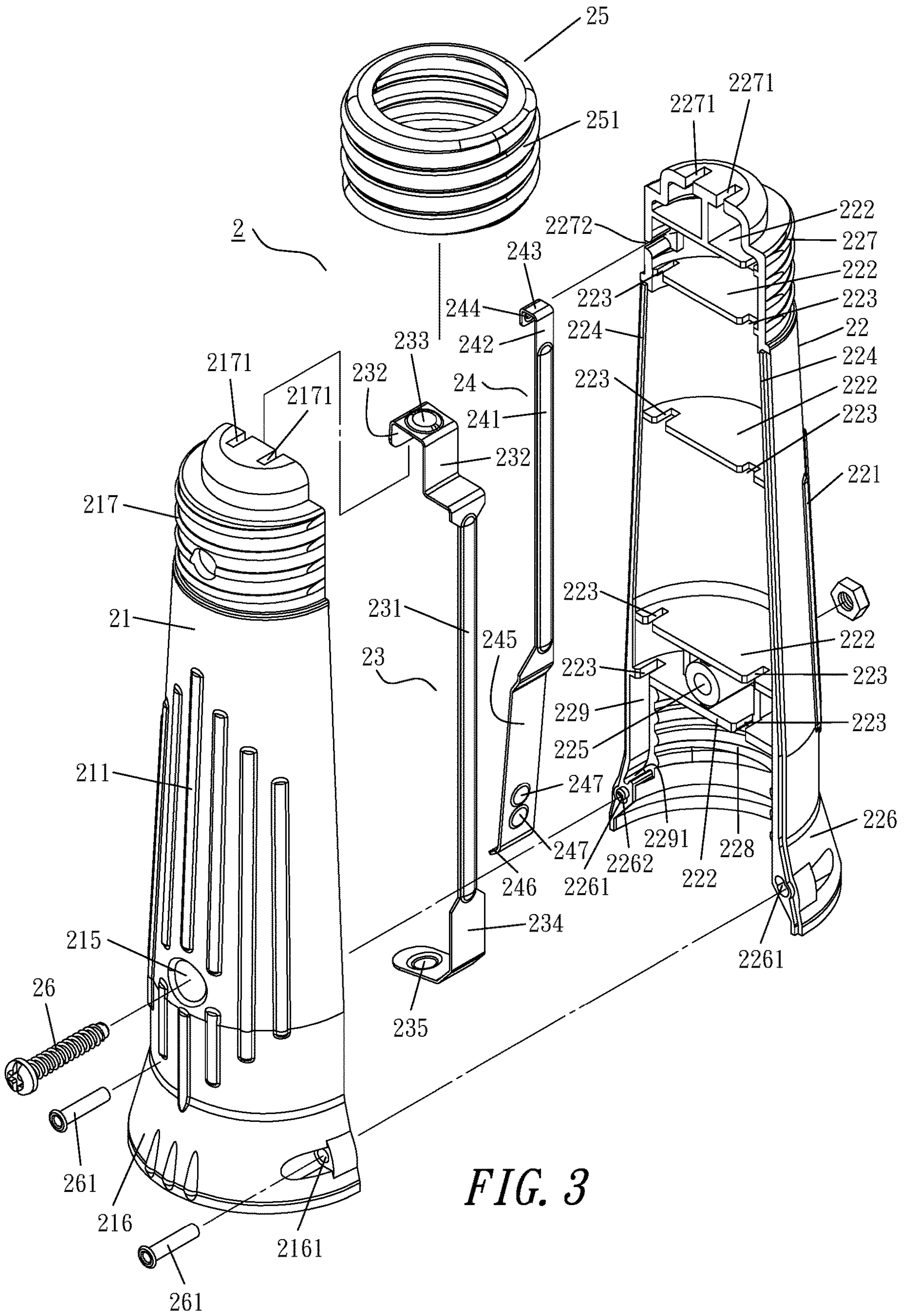
FIG. 3 is an exploded perspective view of the preferred embodiment of the present invention.
Figure 4:
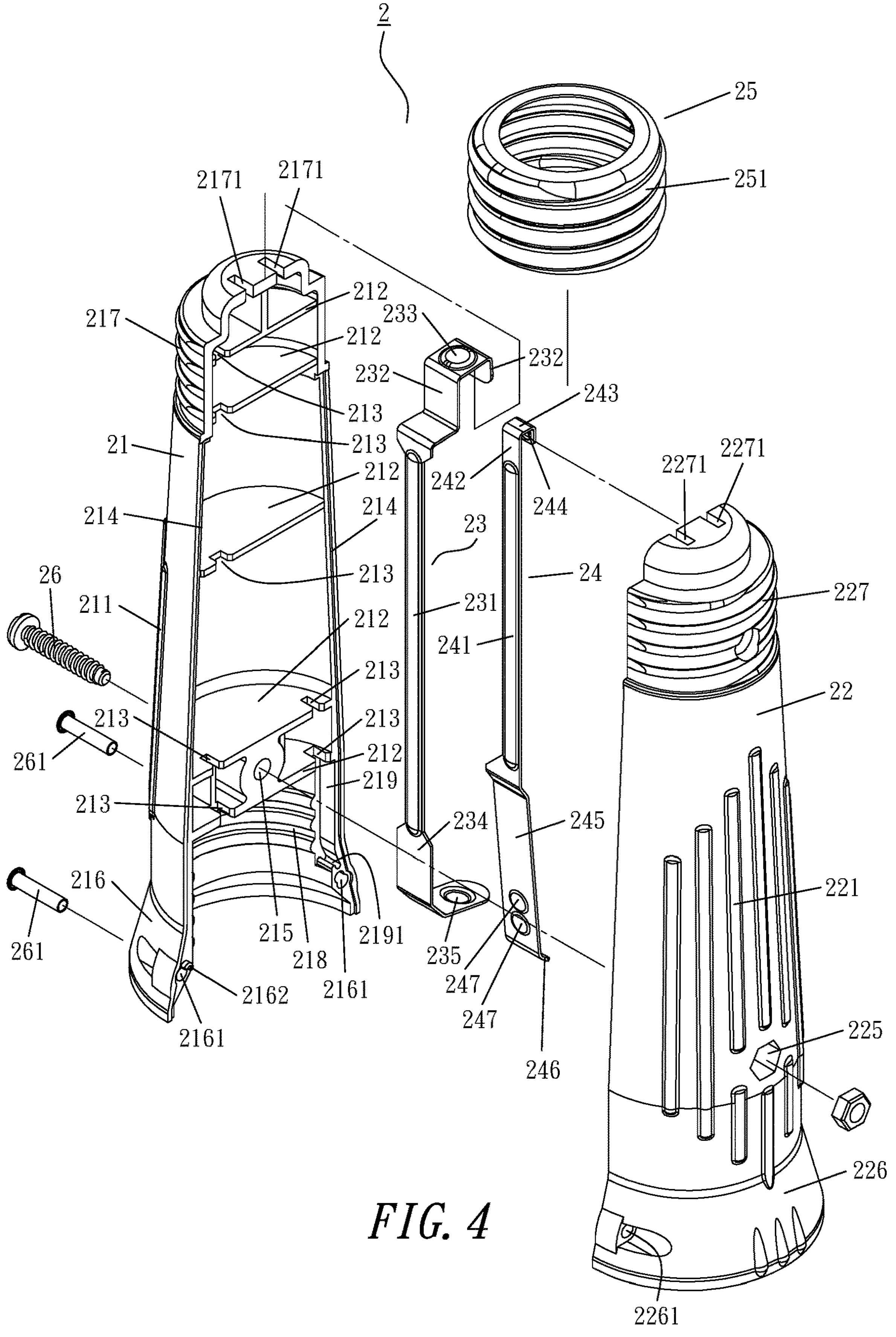
FIG. 4 is an exploded perspective view of the preferred embodiment of the present invention from another angle of view.

Referring to FIGS. 2, 3, and 4, the present invention is an extension lamp socket 2, made up of a first half shell 21, a second half shell 22, a first electrode plate 23, a second electrode plate 24 and an electrode holding ring 25.

The first half shell 21 and the second half shell 22 are non-conducting components and corresponding to each other, both in a long shape having a micro taper top and bottom, and having an arched periphery. The external surface is etched with a plurality of decorative bars 211, 221 to enhance the appearance. In the middle section of the opposite internal spaces, a plurality of clamping plates 212, 222 are configured in the transverse direction. At necessary positions on the front edges of the clamping plates 212, 222, clamping slots 213, 223 are configured. The two side edges of the first half shell 21 are configured as a snapping slot 214, whereas the two side edges of the second half shell 22 are configured as a tenon 224. The first half shell 21 and the second half shell 22 are respectively formed with an penetrating tube slot 215, 225 between the two clamping plates

212, 222 located at a lower position. The bottom section of the first half shell 21 and the second half shell 22 are in the shape of a cover wall 216, 226 expanding outward. A through hole 2161, 2261 is respectively formed on two sides at a position close to the bottom edge. A tiny positioning convex column 2162, 2261 is configured adjacent to one through hole 2161, 2261, and the adjacent space of the other through hole 2161, 2261 is slightly expanded. The outer edge of the top section of the first half shell 21 and the second half shell 22 are both configured as side threaded convex body 217, 227 having a shape of spiral arch convex. The top ends are respectively configured with two parallel top snapping slots 2171, 2271, wherein the side threaded convex body 227 of the second half shell 22 is configured with a transverse clamping slot 2272 (see FIG. 3) on the edge on one side. The inner wall of the first half shell 21 and the second half shell 22 below the penetrating tube slot 215, 225 till the cover wall 216, 226 are configured as internal threaded convex body 218, 228 having a shape of spiral arch convex, and wherein, the edge on the same side as the clamping slot 2272 is further configured with a recessed supporting thin slot 219, 229. Its bottom end further forms a positioning slot 2191, 2291. As the first half shell 21 and the second half shell 22 are corresponding components, the aforementioned clamping plates 212, 222, snapping slots 214 and tenons 224, penetrating tube slots 215, 225, cover walls 216, 226, through holes 2161, 2261, side threaded convex bodies 217, 227, top snapping slots 2171, 2271, internal threaded convex bodies 218, 228, and supporting thin slots 219, 229 are respectively corresponding to each other.

The first electrode plate 23 has an upright base bar 231 extending from top to bottom. Its top edge extends upward for a small section and is then bent inward and then straight upward to form a top clamping plate 232. Then it is bent horizontally and is configured with an upper conducting point 233 at the middle position. In the end, it is bent downward again to form another top clamping plate 232. The bottom edge of the upright base bar 231 extends downward for a small section to form a clamping and connecting plate 234. Then, it is bent inward and further bent slightly, and is configured with a lower conducting point 235 at the middle position. The first electrode plate 23 itself is conductive, but its outer surface can be optionally coated to become non-conductive. However, the upper conducting point 233 and the lower conducting point 235 must be conductive.

The second electrode plate 24 has an upright base bar 241 extending from top to bottom, with its top edge extended for a small section to form a clamping and connecting plate 242, and then extended outward and then downward to form a clamping hook 243. The outer wall of the clamping hook 243 is configured with an upper conducting point 244. The bottom edge of the upright base bar 241 is firstly bent outward in a tilting form, and then gradually goes outward and downward to form a clamping and connecting plate 245, with its final end bent outward to form an inserting and connecting plate 246. The clamping and connecting plate 245 is configured with a plurality of lower conducting points 247. The second electrode plate 24 itself is conductive, but its external surface can be optionally coated to become non-conductive. However, the upper conducting point 244 and the lower conducting points 247 must be conductive.

The electrode holding ring 25 is conductive, with its peripheral wall configured as a side threaded convex body 251 having a continuous spiral arch convex shape, and its top and bottom hollow. The height and inner diameter of the side threaded convex body 251 are in a size to perfectly cover the side threaded convex body 217, 227 after the first half shell 21 and the second half shell 22 are assembled together.

Figure 5:
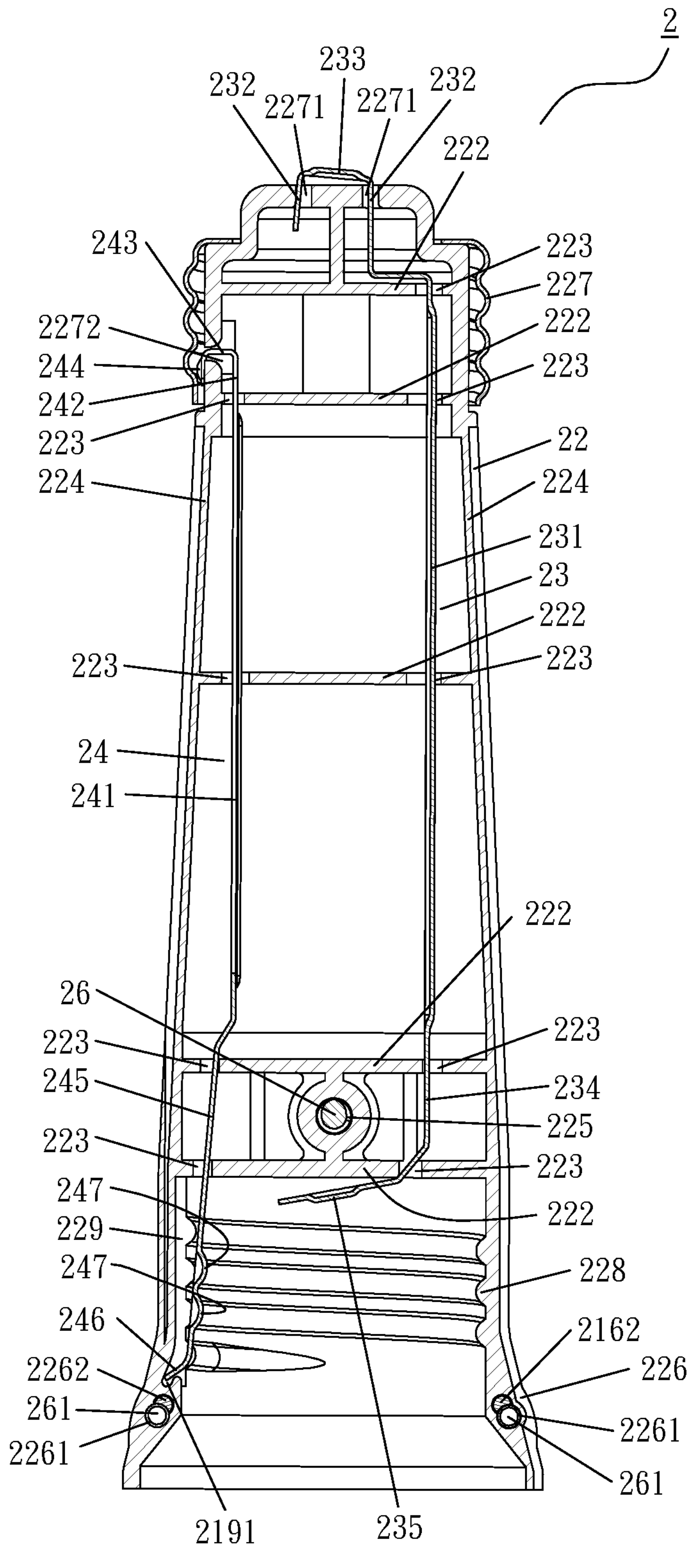
FIG. 5 is a sectional view of the preferred embodiment of the present invention.
Figure 6:
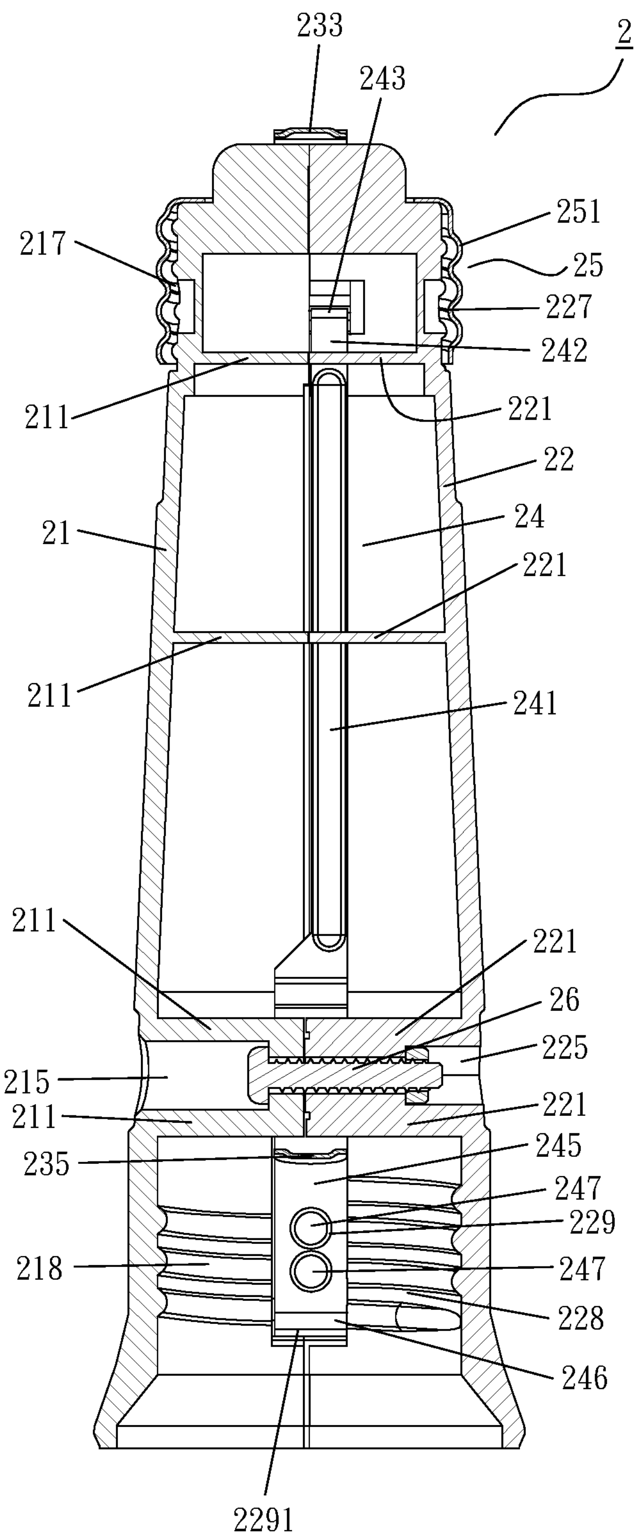
FIG. 6 is a sectional view of the preferred embodiment of the present invention from another angle of view.
Figure 7:
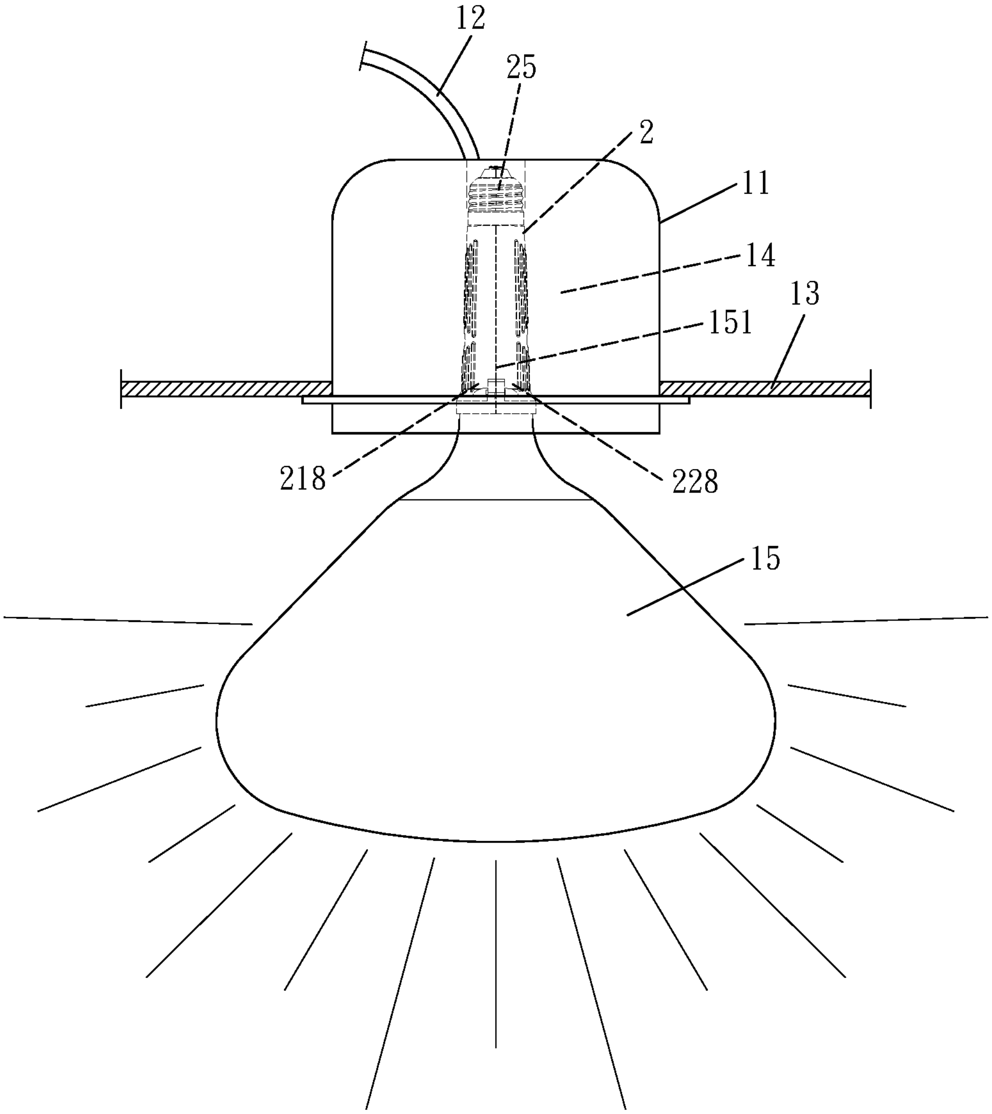
FIG. 7 is a diagrammatic view of the preferred embodiment of the present invention installed with a light bulb that occupies a large space.

Based on the above structure, the assembly is as shown in FIG. 5, 6. Firstly, the first electrode plate 23 and the second electrode plate 24 are assembled with the second half shell 22. The two top clamping plates 232 of the first electrode plate 23 are aligned to and inserted into the two top snapping slots 2271 of the second half shell 22. Meanwhile, the bar body of the upright base bar 231 of the first electrode plate 23 and the clamping and connecting plate 234 will smoothly go into the corresponding clamping slot 223. Now, the upper conducting point 233 of the first electrode plate 23 will protrude out of the second half shell 22. After the clamping and connecting plate 234 extends downward and sticks out of the lowest position of the clamping slot 223, as it is bent inward in a tilting form and then bent slightly, it will push the lower conducting point 235 into the space below the penetrating tube slot 225 and suspend it there (as shown in FIG. 5).

Then, the clamping hook 243 of the second electrode plate 24 is aligned to the clamping slot 2272 from inside the second half shell 22 for hooking. The upper conducting point 244 on the external wall of the clamping hook 243 is placed out of the wall of the second half shell 22. Meanwhile, the bar body of the upright base bar 241 of the second electrode plate 24, the clamping and connecting plate 242, and the clamping and connecting plate 245 will smoothly go into the corresponding clamping slot 223 and be suspended there. Moreover, the bottom section of the clamping and connecting plate 245 of the second electrode plate 24 will approach the supporting thin slot 229, and the inserting and connecting plate 246 on the final end will be perfectly inserted into the positioning slot 2291 for fixation (as shown in FIG. 5).

Then, the snapping slot 214 of the first half shell 21 is aligned to the tenon 224 of the second half shell 22, and the first half shell 21 is covered onto the second half shell 22, so that the snapping slot 214 and the tenon 224 are fitted with each other. During the process, the two top clamping plates 232 of the first electrode plate 23 will perfectly be inserted into the two top snapping slots 2171 of the first half shell 21. Meanwhile, the bar body of the upright base bar 231 of the first electrode plate 23 and the clamping and connecting plate 234 will perfectly go into the corresponding clamping slot 213 of the first half shell 21 and be suspended there, and the upper conducting point 233 of the first electrode plate 23 will protrude out of the first half shell 21 and the second half shell 22. After the clamping and connecting plate 234 extends downward and stick out beyond the lowest position of the clamping slot 213, 223, the lower conducting point 235 will be suspended in the space below the penetrating tube slot 215, 225. During the process, the bar body of the upright base bar 241 of the second electrode plate 24 and the clamping and connecting plate 245 will smoothly go into the corresponding clamping slot 213 and be suspended there. Moreover, the bottom section of the clamping and connecting plate 245 of the second electrode plate 24 will approach the supporting thin slot 219. Meanwhile, the inserting and connecting plate 246 on the final end will be inserted into the positioning slot 2191 for positioning.

Now, the first electrode plate 23 and the second electrode plate 24 are tentatively assembled with the first half shell 21 and the second half shell 22. Then, a first joint component 26 (such as a bolt and nut) can be used to go through the penetrating tube slot 215, 225 to fix them together. Meanwhile, a second joint component 261 (such as a rivet) can be used to go through the through hole 2161, 2261 to fix them together. In this way, the first half shell 21 and the second half shell 22 will not separate. During this process, the positioning convex column 2162, 2261 configured adjacent to the through hole 2161, 2261 will smoothly go into the correspondingly enlarged space of the through hole 2161, 2261 on the other side, making it easier for the bottom sections of first half shell 21 and the second half shell 22 to fit and connect each other more accurately.

In the end, the electrode holding ring 25 is screwed to the side threaded convex body 217, 227 after the first half shell 21 and the second half shell 22 are connected, so that the electrode holding ring 25 and the side threaded convex body 217, 227 are fully and tightly attached to each other. Then, a position on the wall of the electrode holding ring 25 can be selected for pressing and deforming, also causing the side threaded convex body 217 or 227 to be pressed and deformed. Alternatively, the periphery of the bottom end of the electrode holding ring 25 can be slightly pressed for deformation. After the pressing, the electrode holding ring 25 and the side threaded convex body 217, 227 will not separate from each other. When the electrode holding ring 25 and the side threaded convex body 217, 227 are fully and tightly fitted, the electrode holding ring 25 is naturally fitted tightly with the upper conducting point 244 and the second electrode plate 24 to conduct electricity. By now, the assembly of the extension lamp socket 2 of the present invention is completed.

Figure 1:
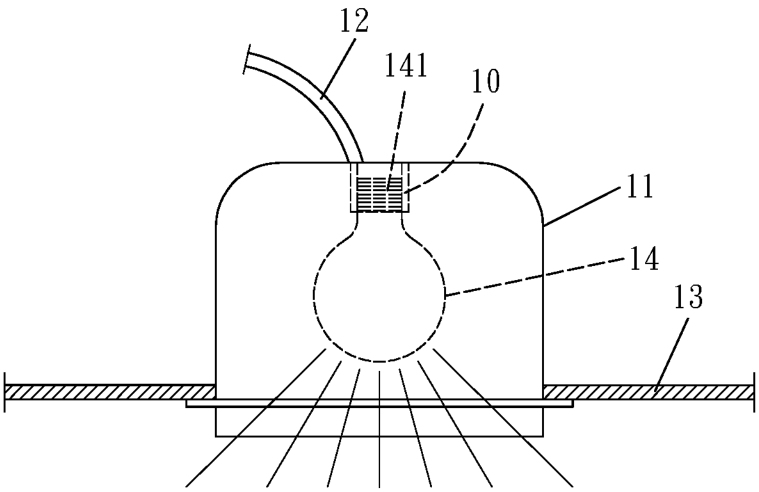
FIG. 1 (PRIOR ART)
FIG. 1 is a diagrammatic view of a prior-art lamp socket installed with a normal light bulb.

The use of the invention is depicted in FIG. 5 (please compare it with FIG. 1). Firstly, one end of the electrode holding ring 25 of the extension lamp socket 2 of the present invention is screwed into the screw connecting part of the lamp socket 10. As the extension lamp socket 2 is extended downward for a section, the outward expanding cover wall 216, 226 of the extension lamp socket 2 is now already close to the opening on the bottom end of the lampshade 11, it is quite easy to extend the screw connector 151 of the light bulb 15 occupying a big space into the cover wall 216, 226 and the internal threaded convex body 218, 228 for threaded connection. During the process, the conducting point on the top end of the screw connector 151 of the light bulb 15 will move upward to push the lower conducting point 235 to realize conduction of the first electrode. Meanwhile, the electrode clamping ring adjacent to the screw connector 151 of the light bulb 15 will push the lower conducting point 247 sideward to realize conduction of the second electrode. Thus, the external power source (such as commercial electricity or charging power) can be conducted through the lamp holder 10 and the extension lamp socket 2 downward to the light bulb 15. In another word, the extension lamp socket 2 is bridged between the lamp socket 10 and the light bulb 15.

Figure 8:
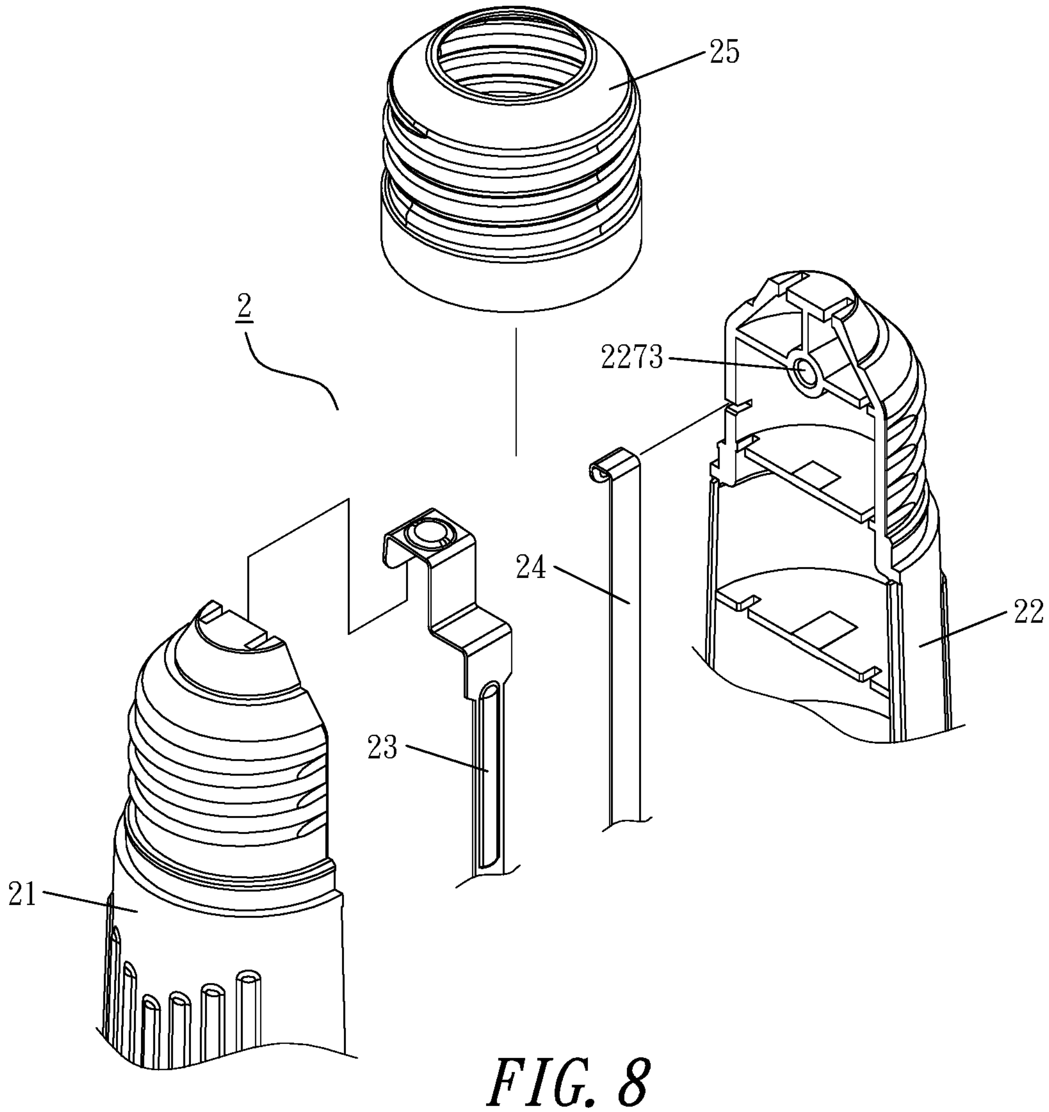
FIG. 8 is a partial perspective view of a structural variation of the preferred embodiment of the present invention.
Figure 9:
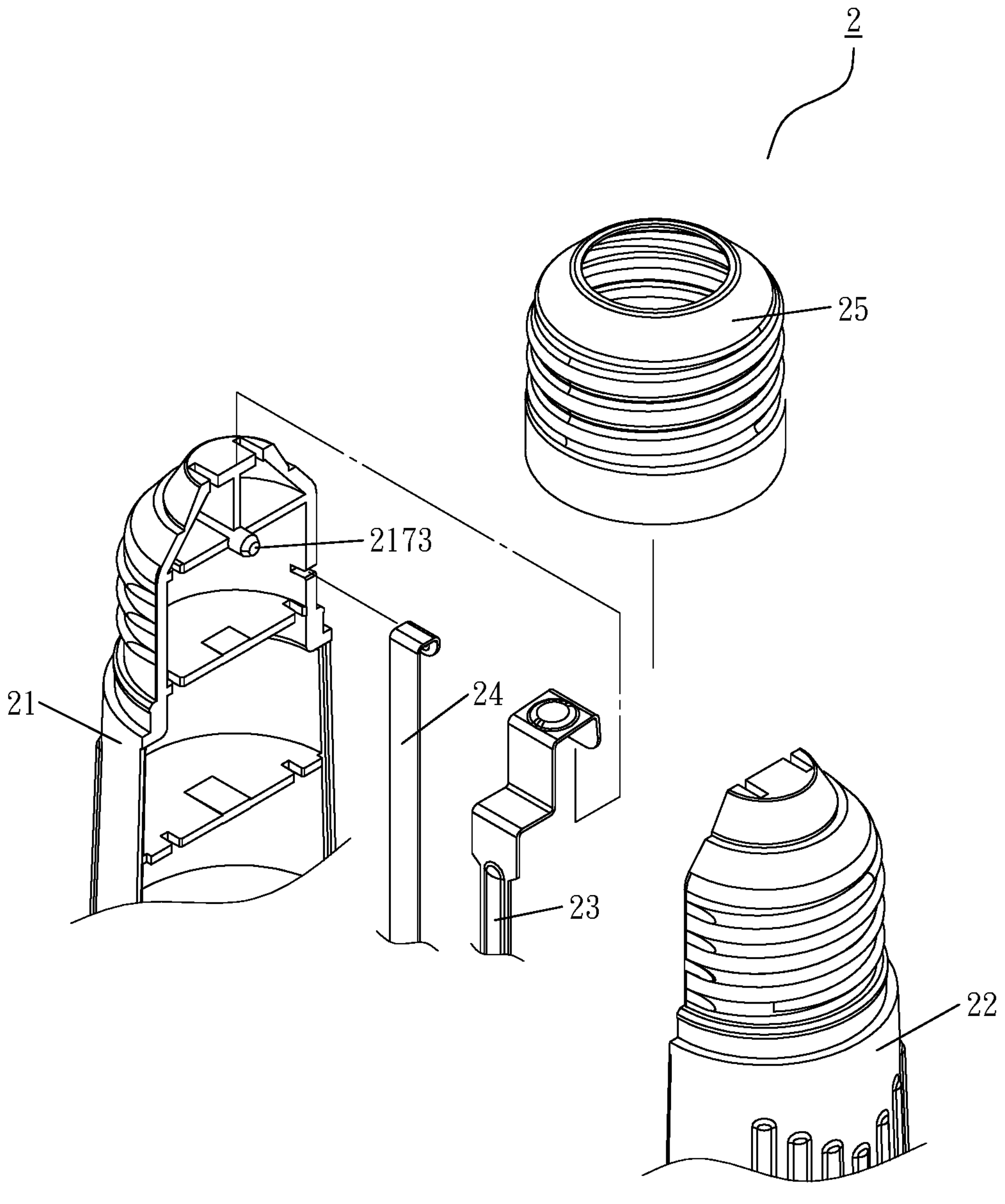
FIG. 9 is a partial perspective view of a structural variation of the preferred embodiment of the present invention from another angle of view.
Figure 10:
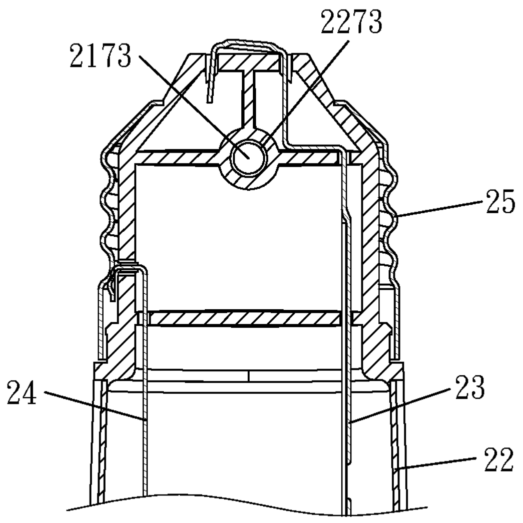
FIG. 10 is a partial sectional view of a structural variation of the preferred embodiment of the present invention.

The internal structure of the extension lamp socket 2 can be slightly changed, as shown in FIG. 8, 9, 10. However, the identical structure is not depicted. The variations mainly include an inserting shaft 2173 configured in the middle of the top section of the first half shell 21 and an inserting slot 2273 configured at the corresponding position on the second half shell 22. Thus, when the first half shell 21 covers the second half shell 22, apart from the fitting between the snapping slot 214 of the first half shell 21 and tenon 224 of the second half shell 22, the insertion of the first joint component 26 through the penetrating tube slot 215, 225 for screw fastening, and the insertion of the second joint component 261 through the through hole 2161, 2261 for screw fastening, the inserting shaft 2173 can be inserted into the inserting slot 2273 for more stable assembly.

According to the above descriptions, the present invention mainly provides an extension lamp socket 2, for connection inside the screw connecting part of the conventional lamp socket 10, so that the extension lamp socket 2 and the conventional lamp socket 10 are joint through threaded connection, and the power source of the conventional lamp socket 10 is conducted to the extension lamp socket 2, and then the extension lamp socket 2 can be connected by the screw connector 151 of other light bulbs 15 from the opening on the bottom end of the cover wall 216, 226. The screw connector 151 is fixed with the internal threaded convex body 218, 228 through threaded connection, and conducts electricity to the light bulb 15. Therefore, when it is needed to install a big light bulb in a limited space, the extension lamp socket 2 of the present invention can be used to lower the screw connecting position. Or, when it is needed to install a light bulb in a narrow or special space, the extension lamp socket 2 of the present invention can be used to extend the screw connecting position outward to facilitate threaded connection of the light bulb.

In summary, the present invention can truly accomplish the anticipated function and purpose, and based on the detailed description, the present invention can be implemented by those skilled in the art. However, the above embodiment is only used to describe the present invention, all equivalent structural variations are covered by the scope of the present invention.

What is claimed:

1. An extension lamp socket, comprising, a first half shell and a second half shell, the first half shell and the second half shell each comprising, a respective top section having a top end, a respective bottom section having a bottom end, a respective internal space, two side edges, each of the first half shell and the second half shell further comprising non-conducting components;

a first electrode plate, a second electrode plate, and an electrode holding ring, wherein:

a plurality of clamping plates are horizontally configured in a middle section formed by the respective internal spaces of the first half shell and the second half shell, a front edge of each of the plurality of clamping plates is provided with a clamping slot, and two of the plurality of clamping plates are located within the bottom section of the first and second half shells, respectively, the two side edges of the first half shell and the two side edges of the second half shell are provided with a structure capable of snapping and jointing the first half shell and the second half shell, the first half shell and the second half shell are respectively formed with a penetrating tube slot between the two clamping plates located within the bottom section of the first and second half shells, respectively, the bottom section of the first half shell and the bottom section of the second half shell are in a shape of an outwardly expanded cover wall, an outer edge of the top section of the first half shell and an outer edge of the top section of the second half shell are both defined as a side threaded convex body having a spiral arch convex shape, the top ends of each of the first half shell and the second half shell are respectively configured with two top snapping slots arranged parallel to each other, the side threaded convex body of the second half shell comprises a transverse clamping slot positioned on an edge of the side threaded convex body, the first half shell and the second half shell are each provided with an internal threaded convex body positioned on an inner wall below the penetrating tube slot, the first half shell and the second half shell are each provided with a recessed supporting thin slot defined on one of the respective side edges and positioned adjacent to one of the respective clamping slots, the bottom end thereof being further formed as a positioning slot;

wherein:

the first electrode plate has an upright base bar extending up and down, wherein:

a top edge of the upright base bar comprises a first electrode top clamping plate, a second electrode top clamping plate, and an upper conducting point, wherein the first electrode top clamping plate comprises a first upward extending portion, a first inward extending portion, and a second upward extending portion, wherein the second clamping plate comprises a downward extending portion, and wherein the upper conducting point is positioned between the second upward extending portion of the first clamping plate and the downward extending portion of the second clamping plate, a bottom edge of the upright base bar comprises a snapping plate and a lower conducting point, wherein the snapping plate comprises a downward extending portion and wherein the lower conducting point extends slopingly inward from the snapping plate, the upper conducting point and the lower conducting point of the first electrode plate are conductive, when assembled, the first and second top electrode clamping plates are aligned to each of the top snapping slots of the second half shell, thereby enabling the upper conducting point to protrude out of the second half shell, a body of the upright base bar is positioned to rest within a portion of the plurality of clamping slots, and the lower conducting point is positioned to rest below the penetrating tube slot, the second electrode plate has an upright base bar extending up and down, wherein:

a top edge of the upright base bar comprises a snapping plate and a clamping hook, wherein an outer wall of the clamping hook is provided with an upper conducting point, a bottom edge of the upright base bar comprises a snapping plate and an inserting connection plate, wherein the snapping plate is configured with a lower conducting point, the upper conducting point and the lower conducting point of the second electrode plate are conductive, when assembled, the clamping hook of the second electrode plate clamps the clamping slot positioned on the interior of the second half shell, thereby enabling the upper conducting point on the clamping hook to be positioned external to the second half shell, a body of the upright base bar of the second electrode plate is positioned to rest within a portion of the plurality of clamping slots, and the lower conducting point is positioned to rest below the penetrating tube slot in the bottom section of the second half shell in a positioning slot, the first half shell faces toward the second half shell to achieve the snapping and jointing function via the two side edges of the first half shell and the second half shell, upon snapping and jointing the first half shell and the second half shell, the top clamping plate of the first electrode plate is correspondingly inserted into each of the top snapping slots of the first half shell, the bar body extending from the upright base bar of the first electrode plate and the snapping plate enter into the clamping slot corresponding to the first half shell to rest, and the upper conducting point of the first electrode plate jointly protrude out of the first half shell and the second half shell, and a first jointing component is used to go through the penetrating tube slots of the first half shell and the second half shell to further secure the first half shell to the second half shell; and the electrode holding ring is conductive and an exterior surface thereof is configured with a side threaded convex hollow body having a convex continuous spiral arch, and, upon assembly, the electrode holding ring is screwed to the side threaded convex hollow body after the first half shell and the second half shell are combined, thereby enabling the electrode holding ring to be completely and tightly jointed with the side threaded convex hollow body.

2. The extension lamp socket of claim 1, wherein the first half shell and the second half shell extend longitudinally and comprise a narrowing taper at the respective top ends and a widening taper at the respective bottom ends.

3. The extension lamp socket of claim 1, wherein the structure capable of snapping and jointing the first half shell and the second half shell comprises a snapping slot and a tenon.

4. The extension lamp socket of claim 1, wherein a through hole is respectively formed on the two side edges adjacent to the bottom end of the first half shell and the second half shell, and wherein upon the first half shell and the second half shell being snapped and jointed, a second joint component is passed through the through hole of the first half shell and the second half shell.

5. The extension lamp socket of claim 4, wherein a micro positioning convex column is additionally configured adjacent to each of the through holes on the two side edges adjacent to the bottom edge of the first half shell and the second half shell, a space on an adjacent edge of the through hole on an opposite side edge is correspondingly expanded, and wherein upon the first half shell and the second half being snapped and jointed, the positioning convex column is inserted into the corresponding expanded space of the through hole on the opposite side edge.

6. The extension lamp socket of claim 1, wherein a first and second structure capable of correspondingly inserting and connecting to each other are disposed the middle of the top section of the first half shell and the second half shell, and when the first half shell and the second half shell are correspondingly snapped and jointed with each other, the first and second structure capable of correspondingly inserting and connecting to each other are connected.

7. The extension lamp socket of claim 6, wherein the first and second structure capable of correspondingly inserting and connecting to each other are an inserting shaft and an inserting slot, respectively.

8. The extension lamp socket of claim 1, wherein upon combining the electrode holding ring with the first half shell and the second half shell, the electrode holding ring is screwed on to the side threaded convex body and the electrode holding ring is deformed, thereby further securing the electrode holding ring to the side threaded convex body.

9. The extension lamp socket of claim 8, wherein after the electrode holding ring is screwed on to the side threaded convex body, a periphery of the bottom end of the electrode holding ring is and deformed, thereby securing the electrode holding ring to the side threaded convex body.

* * * * *